United States Patent Office 3,439,164
Patented Apr. 15, 1969

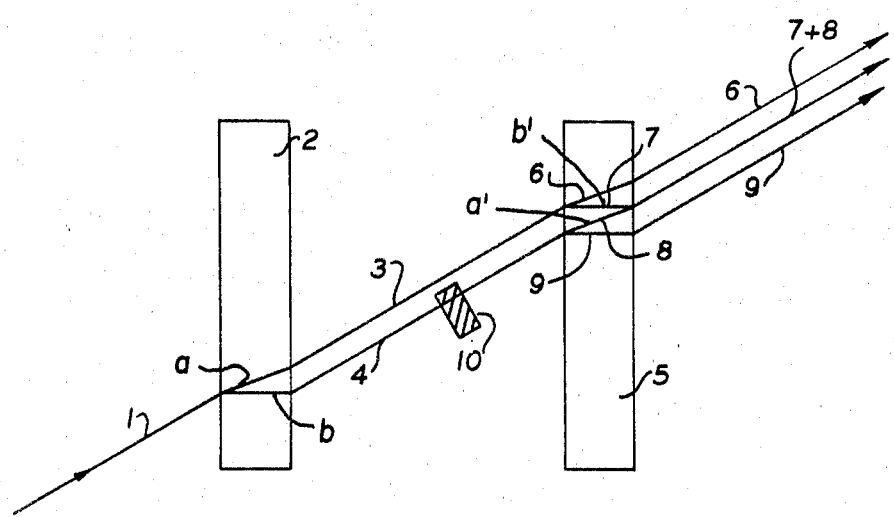

3,439,164
METHOD OF OBTAINING X-RAY INTERFERENCE PATTERNS
Nathan Spielberg, Hartsdale, and Joshua Ladell, Monsey, N.Y., assignors to North American Philips Company, Inc., New York, N.Y., a corporation of Delaware
Filed Sept. 8, 1967, Ser. No. 666,280
Int. Cl. G01n *23/20;* H01j *37/20*
U.S. Cl. 250—51.5       3 Claims

ABSTRACT OF THE DISCLOSURE

X-ray interference patterns are obtained using two parallel perfect crystals of the same thickness which exhibit the Borrmann effect. The crystals are oriented so that a monochromatic X-ray beam incident on the first crystal is simultaneously diffracted from two independent sets of planes in the crystal. The two forward diffracted beams which are parallel but displaced from each other are incident upon the second crystal. The Borrman effect then gives rise to three parallel but displaced forward diffracted beams from the second crystal. The central forward diffracted beam from the second crystal results from a coherent recombination of the two displaced incident beams. The relative phase shift effected by placing a phase shifter in the path of one of the beams incident upon the second crystal is monitored by a change in intensity in the central forward diffracted beam coming from the second crystal.

---

This invention relates to a method of obtaining X-ray interference patterns.

In a copending application Ser. No. 444,547, filed Apr. 1, 1965, now U.S. Patent No. 3,381,127, there is described a method of obtaining X-ray interference patterns using a highly perfect thick crystal which exhibits the Borrmann effect in which there is a forward diffracted monochromatic beam as well as a reflected diffracted monochromatic beam associated with a given set of diffracting planes. The forward diffracted beam is parallel to and displaced from the incident beam direction by an amount dependent upon Bragg's relation and the thickness of the crystal.

The present application provides an alternate method for obtaining X-ray interference patterns. In our method, a monochromatic beam of X-rays is incident upon a first highly perfect crystal which is arranged to give simultaneous reflections from two different sets of planes oriented so that exactly the same wave-length is diffracted by both sets of planes. The planes chosen have different orientations and may have different inter-atomic (*d*) spacings, so that the forward diffracted beams associated with each set of diffracting planes have different displacements from the incident beam direction, thus resulting in two separate but parallel beams of coherent radiation emerging from the crystal. These two beams now are incident upon a second identical highly perfect thick crystal exactly parallel with the first crystal, and each of these gives rise again to a set of two parallel forward diffracted beams, making a total of four parallel beams of coherent radiation. The thickness of the second crystal is the same as that of the first crystal so that two of the four forward diffracted beams will be superposed upon each other, and interference may take place between them. The relative phase of the superposing beams can be varied by the insertion of a phase shifter in the path of one of the beams incident upon the second crystal.

The invention will be described with reference to the drawing, the sole figure of which shows an arrangement for carrying out the method according to the invention.

Referring to the drawing, a beam of coherent monochromatic X-rays 1 incident on a highly perfect thick crystal 2, a portion of which beam is forward diffracted by a first set of diffracting planes, denoted *a* in the crystal, as beam 3 and another portion diffracted by a second set of diffracting planes, denoted *b*, emerges as beam 4. Both beams 3 and 4 are incident upon a second highly perfect thick crystal 5 positioned so that the face upon which beams 3 and 4 are incident is exactly parallel but inverted by a two fold rotation with respect to the face of crystal 2 from which beams 3 and 4 emerge. Beams 3 and 4 are each diffracted by two corresponding sets of planes *b'* and *a'* respectively within crystal 5 so that two forward diffracted beams corresponding to each of the incident beams 3 and 4 emerge from the opposite face of crystal 5. These beams are designated 6, 7, 8 and 9 respectively. However, beams 7 and 8 are coincident so that beam 7 can interfere with beam 8. The relative phase of beams 7 and 8 and hence the nature of the interference may be altered by inserting material 10 into either beam 3 or 4. The intensity of the combined beam 7 and 8 will depend upon the relative intensities of the incident beams 3 and 4, the refractive index and thicknes of material 10 and the phase difference between beams 3 and 4.

By placing a film sensitive to X-rays (not shown) in the path of combined beam 7 and 8, a record of the interference patterns may be obtained, and of course, various data may be obtained therefrom. One particular application is to phase contrast microscopy by X-rays.

Although the invention has been described in connection with an embodiment using two separate crystals, it will be obvious that a single crystal having a channel therein which divides the crystal effectively into two portions may be employed if the crystal possesses a two fold axis normal to the appropriate faces. Accordingly, since this, and other modifications will be readily apparent to those skilled in this art, the invention is not limited to this particular embodiment herein disclosed but is limited only by the appended claims.

What is claimed is:

1. A method of obtaining an X-ray interference pattern comprising the steps of directing a coherent monochromatic beam of X-rays at a highly perfect relatively thick crystal whereby two parallel forward diffracted rays are transmitted by the crystal, directing both these rays at a second highly perfect relatively thick crystal whereby four forward diffracted rays are transmitted from said second crystal, said crystals being parallel and of identical thickness such that two of the four forward diffracted rays transmitted by said second crystal coincide with each other, and varying the phase of one of the rays incident on the second crystal relative to the other so as to vary the interference pattern formed by said coincident rays.

2. A method of obtaining an X-ray interference pattern as claimed in claim 1 in which the phase of one of the rays incident on the second crystal is displaced relative to the other ray by inserting a body of crystalline material in the path of said ray.

3. A method of obtaining an X-ray interference pattern as claimed in claim 1 in which each of the crystals is formed by cutting a channel in a larger crystal.

References Cited

UNITED STATES PATENTS

| | | | |
|---|---|---|---|
| 2,999,931 | 9/1961 | Zingaro | 250—51.5 |
| 3,381,127 | 4/1968 | Spielberg | 250—65 |

WILLIAM F. LINDQUIST, *Primary Examiner.*

U.S. Cl. X.R.

250—65